2 Sheets—Sheet 1.

C. WHIPPLE.

Machine for Shaving Heads of Wood Screws.

No. 684. Reissued April 12, 1859.

N. PETERS, Photo-Lithographer, Washington, D. C.

2 Sheets—Sheet 2.
C. WHIPPLE.
Machine for Shaving Heads of Wood Screws.
No. 684. Reissued April 12, 1859.
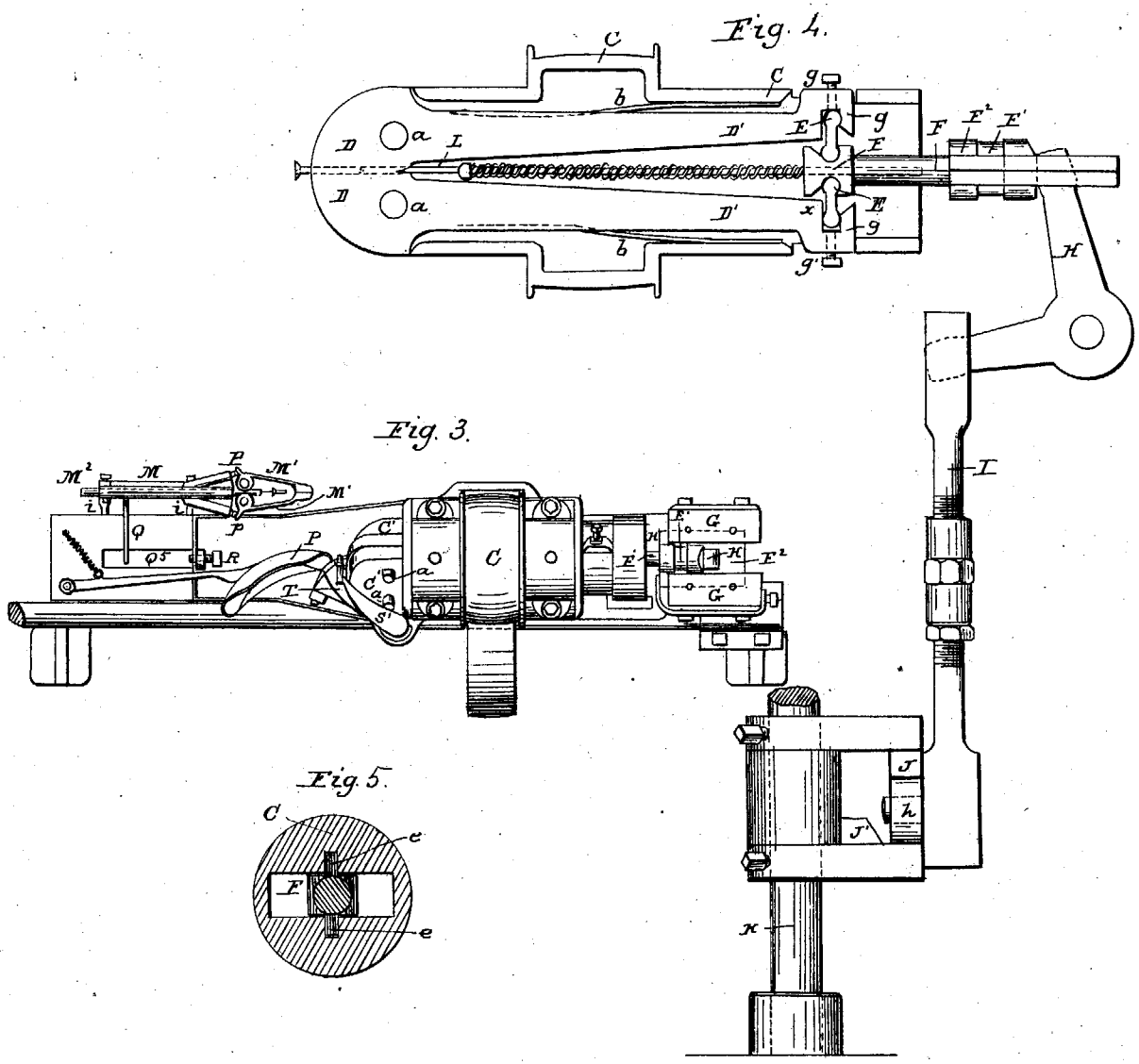
N. PETERS, Photo-Lithographer, Washington, D. C.

UNITED STATES PATENT OFFICE.

CULLEN WHIPPLE, OF PROVIDENCE, RHODE ISLAND, ASSIGNOR, TO NEW ENGLAND SCREW COMPANY.

IMPROVEMENT IN MACHINERY FOR MAKING WOOD-SCREWS, &C.

Specification forming part of Letters Patent No. 9,640, dated December 7, 1852; antedated June 7, 1852; Reissue No. 684, dated April 12, 1859.

*To all whom it may concern:*

Be it known that CULLEN WHIPPLE, of the city and county of Providence, in the State of Rhode Island, did invent a new and useful Improvement in Machinery for the Manufacture of Wood-Screws, of which the following is a full, clear, and exact description, reference being had to the annexed drawings, which make part of this specification, and in which—

Figure 2:
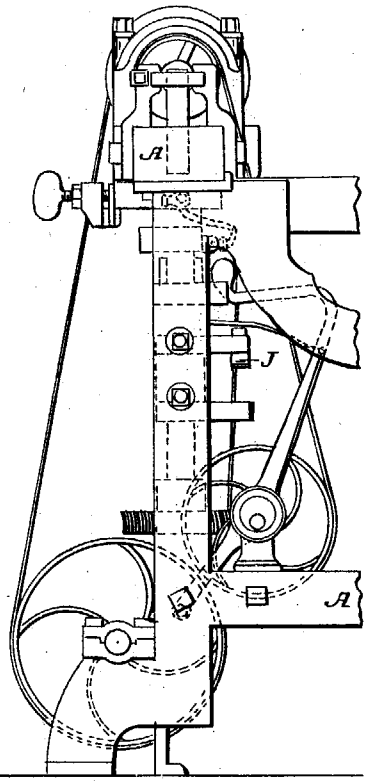
Figure 1:
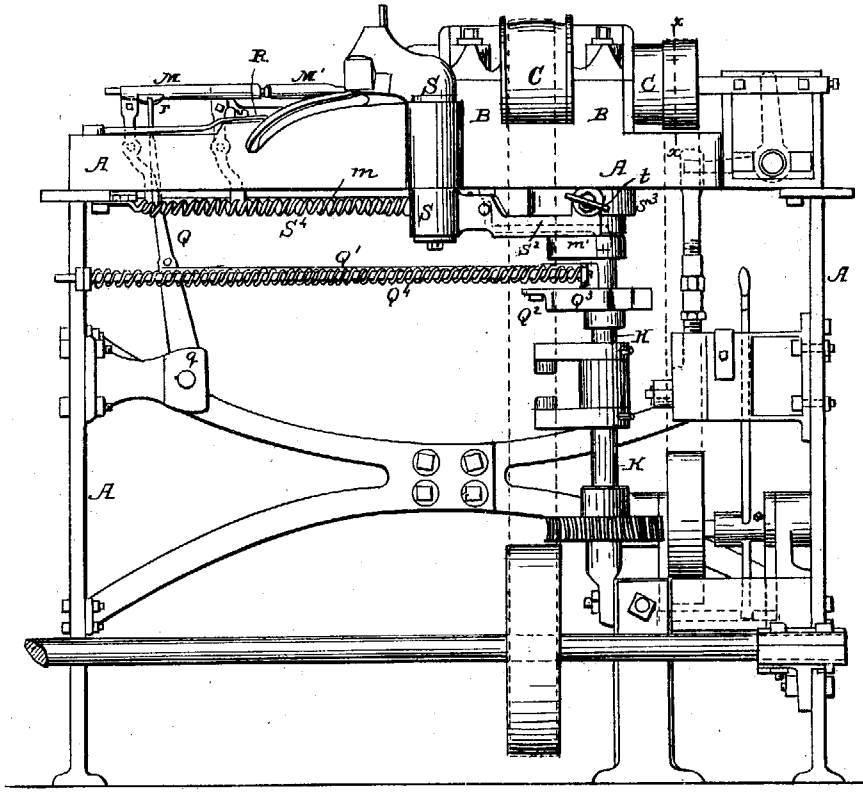

Figure 1 represents a side elevation, Fig. 2 an end elevation, and Fig. 3 a plan, of a machine for shaving the heads of wood-screws, (complete with the exception of the hopper and its adjuncts,) showing one application of said improvement. Fig. 4 represents, on an enlarged scale, the mandrel in section, together with an elevation of the mechanism connected therewith for holding and liberating and for discharging the blank; and Fig. 5 represents a transverse section through the rear of the mandrel at the line *x x* of Fig. 1.

In machines designed to dress screw-blanks automatically while fixed in a revolving mandrel, it is important, in order to prevent irregularity in the size, form, and finish of the screws, that the mandrel should be free from end motion, and therefore free from such end-thrust or wear on the end bearings as will give rise to end motion; and one branch of the said improvement consists of a mechanism for chucking screw-blanks automatically and holding them while being dressed, so constructed that the movements concerned in opening or closing the jaws of the chuck, or in holding them closed, shall not produce endwise pressure upon the mandrel while the blank is being operated on by the cutter.

The machine represented in the accompanying drawings consists, mainly, of a hollow mandrel; of a pair of gripping-jaws carried by the mandrel, which grasp the blank, hold it while being dressed by a cutter, and liberate it when dressed; of suitable mechanism to discharge the dressed blank; of a reciprocating tool-holder which carries the tool forward to dress the head of the blank and withdraws it when the head is dressed; of shafts with pulleys, cams, and other mechanism to give motion to the several acting members of the machine, and of a frame to support the several parts of this mechanism.

The mandrel has its bearings in puppet-heads B B, and the portion of it between the puppet-heads is enlarged and turned into the proper form to act as a pulley for the belt which gives it motion. The gripping-nippers D D are supported between a pair of lugs, C′ C′, that project from the front extremity of the mandrel, and are secured there by joint-pins *a a*, which pass through the lugs and the nippers. The shanks D′ D′ of the nippers are made long to give them considerable elasticity, extend to near the rear end of the mandrel, and are forced toward each other by springs *b b*, to keep the jaws open when not grasping a blank. The jaws are shut by forcing the shanks apart, which is effected in this instance by means of a pair of toggles, E E, diverging from a central block, F, which has two arms, *e e*, that slide in grooves in the mandrel to guide the block. This block forms the head of a bar, F′, whose axis is in line with that of the mandrel, and whose hinder extremity is swiveled to a cross-head, $F^2$, between a pair of standards, G G′, on the hinder extremity of the bench A. The inner sides of these standards have grooves on a level with and parallel to the axis of the mandrel for the cross-head to slide in toward and from the end of the mandrel. The inner extremities of the toggles are seated in sockets in the head F, and their outer extremities in boxes *g g* in recesses in the hinder extremities of the nipper-shanks. By means of set-screws *g′ g′* in the shanks the boxes *g g* can be adjusted to make the toggles cause the jaws to approach within a greater or less distance of each other, as may be required for gripping blanks of different sizes and with varying degrees of pressure.

Beneath the cross-head $F^2$ an elbow-lever, H, is pivoted to the bench. This lever is vibrated at intervals, and one of its arms, entering a slot in the cross-head $F^2$, vibrates it, together with the bar F′ and the block F. The other arm of the lever enters a slot in the upper extremity of a bar, I, that slides up and down in suitable guides. The lower extremity of this bar carries an anti-friction wheel, *h*, within the range of two revolving cams, J J′, on the shaft K, which alternately elevate and depress it, to raise and lower the bar I, and to vibrate the lever H.

When the blank has been introduced between the gripping-jaws by the feeding mechanism, (which, as it forms no part of the particular improvement secured by this patent, need not here be described,) the cam J, through the bar I and elbow-lever H, forces the bar F′ and block F forward, extending the toggles and thrusting the nipper-shanks apart, thereby closing the jaws upon the blank. The movement of the bar F′ is continued until the toggles are pushed slightly beyond a straight line, to cause them to rest locked against the stops *x x* on the shanks D′ D′ and hold the gripping-jaws firmly closed. The relaxation of the grasp of the jaws upon the blank, when the toggles are thus beyond a straight line, is prevented by the elasticity of the shanks. At this stage of the operation, and until the blank is dressed, the further exertion of force by or upon the cross-head $F^2$ is suspended. Under this arrangement the whole system of forces concerned in maintaining the hold of the jaws upon the blank (which consists of the mutual actions and reactions of the stops or holdfasts *x x*, the toggles, the shanks and jaws of the nippers, and the blank) resides and terminates wholly within the mandrel itself, and therefore can produce no thrust upon the mandrel tending to force it against its end bearings.

The blank being dressed, the cam J′ comes into action, and, through the medium of the bar I and lever H, draws the bar F′ and block F backward, flexing the toggles, and allowing the jaws to open and release the blank.

The said improvement has been described as applied to machinery specially adapted to shaving the heads of screw-blanks; but it is evident that it may be applied to machinery for performing other operations in dressing screw-blanks.

Instead of the toggle-levers to open and close the jaws of the gripping-nippers, various other known devices may be used in connection with a suitable holdfast, with like effect. These and other modifications of the mechanism, if circumstances should render it expedient to make them, can readily be carried into practice by skillful mechanicians.

What is claimed under this patent as the invention of the said CULLEN WHIPPLE is—

1. In combination with a mandrel which carries chuck or gripping-jaws, an automatic mechanism for closing said jaws upon the blank, keeping them closed to hold the blank while being dressed, and then opening them to release the dressed blank, arranged and operating in such manner as to leave the mandrel (during the time that the blank is being acted on by the cutter) free from endwise pressure by the chucking mechanism.

2. The combination of toggle-levers carried by the mandrel, a stop or holdfast, also carried by the mandrel, to lock and hold the toggle-levers when pushed beyond a straight line, and gripping-jaws with shanks having sufficient elasticity to maintain a firm hold of the jaws upon the blank when the toggle-levers have passed a straight line, substantially as herein set forth.

In testimony whereof the said company has hereunto signed its name and affixed its seal.

NEW ENGLAND SCREW COMPANY,
By HENRY L. KENDALL,
*Agent.*

Witnesses:
P. H. WATSON,
HENRY BALDWIN, JR.